3,048,495
TEMPORARY OXIDATION-PREVENTIVE
COATING FOR METAL
John J. Petkus, Whiting, and James F. Wygant, Gary, Ind., assignors to Standard Oil Company, Chicago, Ill., a corporation of Indiana
No Drawing. Filed July 2, 1959, Ser. No. 824,451
6 Claims. (Cl. 117—6)

This invention relates to a method and means for affording temporary prevention against oxidation of metal surfaces while exposing the surfaces to high temperatures such as those encountered when applying enamels. In particular, the invention provides a method for temporarily coating a ferrous metal surface with a novel oxidation preventive prior to high temperature exposure, and after such exposure washing off the coating to provide the original metal surface in an unoxidized and uncoated form.

In various manufacturing operations it is desirable to coat a portion only of a metal surface with a vitreous enamel while leaving the balance of the surface in a bare uncoated condition. Where the metal is susceptible to oxidation at enamel fusing temperatures, there is a serious problem in preventing the bare portion from oxidizing. Heretofore, it has been the practice to avoid the problem by conducting the fusing operation in an inert non-oxidizing or reducing atmosphere. Unfortunately, the provision of such atmospheres necessitates an elaborate and expensive furnace installation.

Accordingly, a primary object of the present invention is to provide a method of coating that portion of a metal part or surface which is to remain bare with a refractory material having the ability of being readily removed after an enamel fusing operation. Another object is to eliminate the necessity for conducting the enamel fusing operation in special inert atmosphere furnaces. Other and more particular objects will become apparent as the description of the individual proceeds in detail.

Briefly, in accordance with the invention, a refractory water-dissolvable coating is provided which comprises essentially an intimate mixture of a plastic clay with boric acid (or its anhydride). This mixture, when used as an aqueous slip or slurry, may readily be applied to that portion of an oxidizable metal surface which is to remain uncoated by enamel. The balance of the metal surface is then, either before or after the application of the aforesaid clay-boric acid mixture, coated with a suitable enamel precursor or slip, and the metal part then heated at a suitable enamel-vitrification temperature to fuse the enamel.

A simplified flow diagram is as follows:

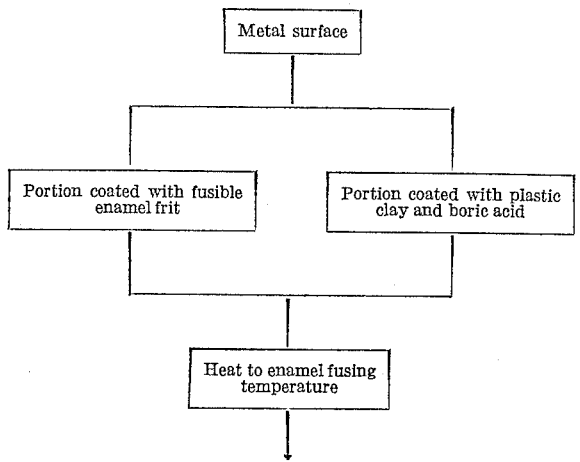

Clays suitable for use herewith are the so-called plastic clays, such as ball clay, bond clay, fire clay, plastic kaolin, stoneware clay, etc. These clays have the distinctive characteristic of forming an adherent deformable mass when mixed with water in small amounts. Such clays, when wetted, hold their shape permanently under the action of small shearing stresses but they are readily deformed, worked, or molded under somewhat larger stresses. Suitable clays are preferably the montmorillonites, e.g. the swelling bentonites, but may be of the kaolin, illite, attapulgite, or allophane groups, provided they are sufficiently plastic.

The mixture of clay and boric acid is made up in suitable proportion to provide a material which is solid when dry and has the characteristic of being water soluble after heating to temperatures in excess of about 1100° F. Suitable ratios of clay to boric acid depend largely on the plasticity of the particular clay, and illustratively may range from 1 part of boric acid per part of clay to about 100 parts of acid per part of clay, preferably from 3 parts of boric acid per part of clay to about 30 parts per part of clay. Ordinarily, the mixture comprises a minor amount of clay; if, after firing, it is found that the coating is difficult to remove, the amount of clay for subsequent work should be reduced. The mixture of clay and boric acid is desirably well ground and then either used dry or formed into a soupy or pasty mixture or "slip" by mixing with sufficient water before application onto the metal surface to be protected.

An illustrative composition suitable for use in accordance with invention comprises 10 parts by weight of Wyoming bentonite to 100 parts of boric acid, and 10 parts of water to form a rather thick slip or paste. This mixture may be applied by dipping the metal part into the resultant slip or by brushing, spraying, pouring or the like.

After coating portions of the surface with vitreous enamel slip and with the inventive boric acid-clay mixture, the metal part is desirably heated in an oven to a sufficient temperature to remove excess water. A temperature of about 150–200° F. is preferred for this operation.

The metal part may then be exposed in an ordinary furnace to the temperature necessary to fuse the enamel. Boric acid melts at about 365° F. and decomposes to boric acid anhydride, while boric acid anhydride has a melting point of about 1100° F. Accordingly, oxidation protection is provided at temperatures of from 365° F. on up, and apparently is even more effective at temperatures above 1100° F. Carbon steel does not oxidize appreciably below about 850° F. Carbon steel parts have been successfully treated according to the inventive operation at enamel fusing temperatures of 1580° F., with times ranging from 5 to 15 minutes or longer.

The inventive method finds very advantageous utility in the enamel coating of conductometric corrosion test specimens. In patents such as U.S. Patent 2,735,754 to Andrew Dravnieks there are described methods for determining the corrosion rate of a metal sample by measuring the change in resistance of the sample due to the decrease in its cross-sectional area caused by corrosion. Such samples are desirably made in two parts, one of which may be protected from corrosion by coating with an enamel while an adjacent part is bare and exposed to a corodant. Protected lead wires connect to remote portions of each part and are joined to suitable electrical resistance measuring circuits. Such corrosion test samples are readily fabricated by the inventive process merely by coating the portion to remain bare with a temporary protective coating of the boric acid-clay composition and subsequently applying an enamel slip to the portion which is to be permanently coated.

The protective coating, once applied and furnace fired, is readily removed upon exposure to water or similar aqueous solvents. The resultant surface is accordingly maintained in an oxidation-free uncoated condition.

By way of example, a carbon steel specimen to be used for conductometric corrosion tests is cut into a strip about 3″ long by ¼″ wide by 0.030″ thick. To Chromel lead wires are welded to each end, and two more wires are welded to the center and spaced slightly apart. The region from one end of the strip to and including one of the center lead wires is coated with a mixture of 10 parts by weight of Wyoming bentonite, 100 parts of finely ground boric acid, and 10 parts of water.

The balance of the specimen is first edged by coating the sharp edges with a slip composed of 40 parts of enamel slip, 2 parts bentonite, 6 parts of silica flour, and 20 parts water. The specimen is then dried at about 200° F.

The final enamel coat over the half to be protected is applied from a frit having the following composition:

| | Wt. percent |
|---|---|
| $Na_2O$ | 14–18 |
| $K_2O$ | 0.4–0.7 |
| $B_2O_3$ | 13–16 |
| $Al_2O_3$ | 1–4 |
| $SiO_2$ | 64–67 |
| CaO | 0.2–0.4 |
| $F_2$ | 0.7–1.1 |
| CoO | 0.4–0.6 |
| MnO | 1.4–1.6 |

This frit was prepared from the following materials:

| | Wt. percent |
|---|---|
| Keystone feldspar | 3–5 |
| Borax | 30–35 |
| Silica | 47–50 |
| Soda ash | 7–9 |
| Soda nitre | 3–4 |
| Manganese dioxide | 1–2 |
| Cobalt oxide | 0.5–1 |
| Fluorspar | 0.2–0.6 |
| Cryolite | 1–2 |

The specimen is fired at 1580° F. for 5–15 minutes in an uncontrolled atmosphere furnace, permitted to cool slowly to room temperature, and then washed with warm water. The specimen half protected by the clay-boric acid mixture is clean and bright.

It is therefore apparent that the objects above have been satisfied and there is provided in accordance with the invention a method for protecting metal surfaces, especially ferrous metal surfaces, from oxidation at high temperatures. While the invention has been described with reference to preferred embodiments thereof, it is to be understood that these are by way of illustration only. Accordingly, it is contemplated that modifications and variations can be made in the process by those skilled in the art in light of my description without departing from the spirit of the invention.

We claim:

1. The method of protecting metal surfaces from oxidation during exposure to elevated temperatures which comprises applying to said surfaces a composition consisting essentially of a plasitc clay and from about 1 to about 100 parts of boric acid per part of said clay, said composition being characterized by its water solubility after exposure at temperatures in excess of 1100° F.

2. Method of claim 1 wherein said composition is applied in the form of an aqueous slip.

3. The method of protecting ferrous metal surfaces from oxidation during exposure to an oxidizing atmosphere at temperatures above about 1100° F., which comprises applying to said surfaces an aqueous slip consisting essentially of a plastic clay and from about 1 to about 100 parts of boric acid per part of said clay, said composition being characterized by its water solubility after exposure at temperatures in excess of 1100° F.

4. The method of claim 3 wherein said aqueous slip consists essentially of a plastic clay and from 3 to about 30 parts of boric acid per part of said clay.

5. The method of applying to a portion only of a metal surface a fusible enamel coating which comprises: applying to the portion of said surface which is to be coated a fusible enamel frit, applying to the portion of said surface which is to remain uncoated an aqueous composition consisting essentially of a plastic clay and from about 1 to about 100 parts of boric acid per part of said clay, heating the thus-coated surface to a temperature sufficient to fuse said enamel, and thereafter washing the surface with water to remove the said composition of clay and boric acid.

6. Method of claim 5 wherein said metal surface is a conductometric corrosion test specimen.

References Cited in the file of this patent

UNITED STATES PATENTS

| 892,269 | Lamon | June 30, 1908 |
|---|---|---|
| 1,190,937 | Moore | July 11, 1916 |
| 1,980,670 | Eckman et al. | Nov. 13, 1934 |
| 2,137,715 | Erdmann et al. | Nov. 22, 1938 |
| 2,237,592 | Dunbeck | Apr. 8, 1941 |
| 2,321,917 | Jenkins | June 15, 1943 |
| 2,874,617 | Eckert | Feb. 24, 1959 |
| 2,889,238 | Long et al. | June 2, 1959 |
| 2,955,958 | Brown | Oct. 11, 1960 |